Figure 1:
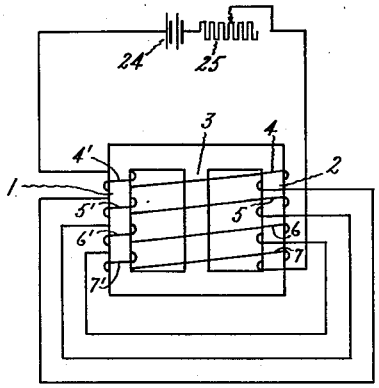

M. OSNOS.
MEANS FOR CONTROLLING ALTERNATING CURRENTS.
APPLICATION FILED JULY 8, 1915.

1,227,302. Patented May 22, 1917.

Inventor:
Mendel Osnos,
by *Allen S. Davis*
His Attorney.

UNITED STATES PATENT OFFICE.

MENDEL OSNOS, OF BERLIN, GERMANY, ASSIGNOR TO GENERAL ELECTRIC COMPANY, A CORPORATION OF NEW YORK.

MEANS FOR CONTROLLING ALTERNATING CURRENTS.

1,227,302.  Specification of Letters Patent.  Patented May 22, 1917.

Application filed July 8, 1915. Serial No. 38,690.

*To all whom it may concern:*

Be it known that I, MENDEL OSNOS, a subject of the Czar of Russia, residing at Berlin, Germany, have invented certain new and useful Improvements in Means for Controlling Alternating Currents, of which the following is a specification.

My present invention relates to devices for controlling alternating currents in which a magnetic flux produced by a direct current is superimposed upon a magnetic flux produced by an alternating current either for the purpose of varying the inductance of the alternating current circuit or for producing a second alternating current having a frequency double that of the original alternating current.

It has heretofore been proposed to make a variable inductive resistance by placing in series with the alternating current circuit to be controlled two coils wound on the outer branches of a three branched closed magnetic core and employing a direct current winding on the middle branch with means for varying the current therein. In this case the alternating flux does not pass through the middle branch and the direct current ampere turns necessary to magnetize this branch have no effect upon the inductance of the alternating current circuit. A second arrangement which has been proposed consists in using two separate magnetic cores with an alternating current winding and a direct current winding on each core. In this case all of the direct current ampere turns are effective in magnetizing the path of the alternating current flux. It is also true that in this case there is induced in each of the direct current windings by the transformer action an alternating potential having the same frequency as the inducing current. By connecting the two direct current windings in opposition to each other the effect of this potential upon the battery or other apparatus in the direct current circuit may be eliminated. At the same time, however, there will be set up a difference of potential between the individual turns of the direct current winding and in case the number of direct current turns is large in comparison with the alternating current turns it may be necessary to insulate the direct current winding for very high voltages.

The object of my invention is to prevent the building up of such high potentials of the primary frequency in the direct current winding and at the same time secure the advantage of having all of the direct current ampere turns effective in magnetizing the path of the alternating current flux.

In carrying my invention into effect, I arrange the windings in such a way that portions of the direct current winding, which are electrically adjacent, are threaded by two opposing alternating current fluxes. By arranging the winding so that each of these portions comprises less than one-half of the entire winding the potential induced in the winding is neutralized before it has had an opportunity to build up to a value sufficient to injure the insulation.

Figure 2:
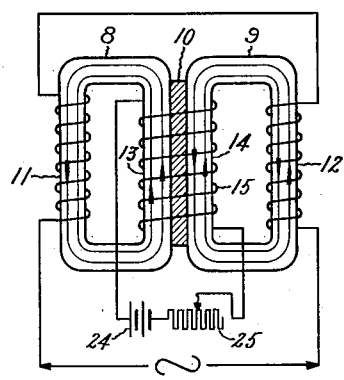
Figure 3:
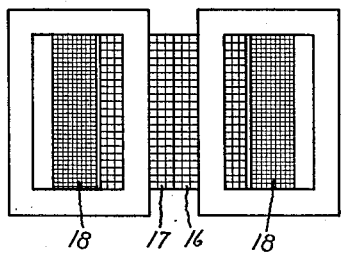
Figure 4:
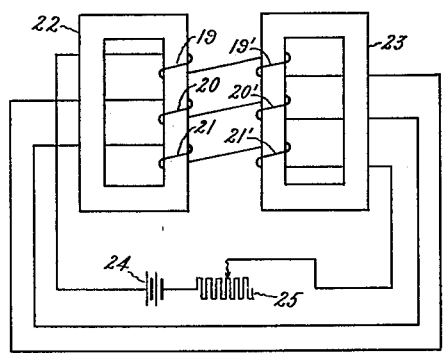

My invention will best be understood by reference to the following description taken in connection with the accompanying drawing in which Figure 1 illustrates diagrammatically one embodiment of my invention, and Figs. 2, 3 and 4 show modifications thereof.

In the form shown in Fig. 1 a three branched magnetic core is employed, the direct current controlling windings being placed on the outer branches 1 and 2 while an alternating current winding, not shown in the drawing, may be placed on the central core 3. In this case the direct current windings are divided into separate groups of turns 4, 5, 6, 7 and 4′, 5′, 6′, 7′, and groups of turns are connected in opposition to each other in pairs 4, 4′, 5, 5′, 6, 6′, 7, 7′, so that one group is threaded by the alternating current flux in one direction and the next group in the series is cut in the opposite direction by the alternating current flux. This arrangement has the disadvantage that only a portion of the direct current flux threads the central core and therefore a greater number of exciting turns is required than if all of the core were saturated by the direct current flux.

This disadvantage is overcome in the form shown in Fig. 2 which is a preferred form of my invention. In this case two closed magnetic cores 8 and 9 are employed which are magnetically separated from each other by a strip of non-magnetic material 10 or by any other desired means but which are mechanically connected together. The alternating current windings are wound upon the outer legs 11 and 12 of these cores so that the alternating current flux passes through the central cores 13 and 14 in opposite directions. The direct current winding 15 is wound about these cores as indicated, so that half of each turn is cut by an alternating flux in one direction and the other half by an alternating flux in the opposite direction. Hence the induced potentials are neutralized in each individual turn of the winding.

In cases where it is desired that as little leakage as possible shall take place between the direct and alternating current turns as, for example, if the device is to serve as a frequency doubler or for wireless telephony, it may be desirable, as indicated in Fig. 3, to place the alternating current windings 16 and 17 on the central cores and wind the direct current turns 18 over the outside of coils 16 and 17. This, however, will not change the method of operation of this modification from that of the form shown in Fig. 2.

In Fig. 4 I have illustrated a modification which overcomes the disadvantage which I have pointed out in connection with the form shown in Fig. 1. In this case two magnetic cores are employed and the direct current winding on each core is divided up into groups of turns and the groups of turns are connected in pairs 19, 19', 20, 20', and 21, 21', so that one group is threaded by the alternating current flux in one direction and the next group in the series is threaded in the opposite direction by the alternating flux. In this case the alternating current winding is placed upon the outer branches 22 and 23 and all of the direct current ampere turns are utilized in magnetizing the path of the alternating current flux.

In Figs. 1, 2 and 4 I have indicated a direct current battery 24 and variable resistance 25 for providing a variable direct current in the controlling windings. It will of course be apparent that the arrangements described will operate in the same way irrespective of the source of the direct current and that by the proper connections currents of double frequency may be obtained either from the direct or alternating current windings or from other windings placed upon the same cores.

What I claim as new and desire to secure by Letters Patent of the United States, is,—

1. The combination with a winding supplied by a source of direct current, said winding consisting of a plurality of portions each of which comprises less than one-half of the entire winding, of means for producing two separate alternating magnetic fluxes and means whereby the alternating fluxes thereby produced thread alternate portions of the direct current winding in opposite directions.

2. The combination of two closed magnetic cores having portions which are adjacent to each other but magnetically separate, means for producing alternating magnetic fluxes in said cores which are opposite in direction in the adjacent portions thereof and a winding surrounding said adjacent portions and connected to a source of direct current.

3. The combination of a winding supplied by a source of direct current, said winding consisting of a plurality of portions each of which comprises less than one-half of the entire winding, and means whereby portions of said winding which are electrically adjacent are threaded by opposing alternating magnetic fluxes.

4. The combination of a winding supplied by a source of direct current and means whereby a portion of each turn in said winding is threaded by an alternating magnetic flux in one direction and another portion is at the same time threaded by an alternating magnetic flux in the opposite direction.

5. The combination of two closed magnetic cores, means for producing alternating magnetic fluxes in said cores and a winding supplied by a source of direct current so arranged that portions thereof which are electrically adjacent are threaded by said alternating magnetic fluxes in opposite directions, each of said portions comprising less than one-half of the entire winding.

6. The combination of two closed magnetic cores, means for producing alternating magnetic fluxes in said cores and a winding supplied by a source of direct current, a portion of each turn of which is threaded by one of said alternating fluxes in one direction while another portion is threaded by the other alternating flux in the opposite direction.

In witness whereof, I have hereunto set my hand this 7th day of June, 1915.

MENDEL OSNOS.